(12) United States Patent
Line et al.

(10) Patent No.: US 10,464,466 B2
(45) Date of Patent: Nov. 5, 2019

(54) BOX LINK VERTICAL TRACK

(71) Applicant: Ford Global Technologies, LLC, Dearborn, MI (US)

(72) Inventors: Johnathan Andrew Line, Northville, MI (US); Keith Allen Godin, Dearborn, MI (US); Gregory Hagedorn, Bloomfield Hills, MI (US); Christopher Anthony Danowski, Rochester Hills, MI (US); Kevin Preuss, Berkley, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 148 days.

(21) Appl. No.: 15/699,913

(22) Filed: Sep. 8, 2017

(65) Prior Publication Data
US 2019/0077294 A1    Mar. 14, 2019

(51) Int. Cl.
*B60P 7/08* (2006.01)
*B60P 7/10* (2006.01)
*B60P 7/12* (2006.01)

(52) U.S. Cl.
CPC .............. *B60P 7/0815* (2013.01); *B60P 7/10* (2013.01); *B60P 7/12* (2013.01)

(58) Field of Classification Search
CPC ................ B60P 7/08; B60P 1/486; B60P 3/14
USPC ........... 410/2; 296/37.6, 37.1; 414/432, 812; 224/403, 543, 402, 404
See application file for complete search history.

(56) References Cited

U.S. PATENT DOCUMENTS

| | | | | |
|---|---|---|---|---|
| 4,564,167 A * | 1/1986 | Smith | ..................... | B60R 11/06 224/404 |
| 5,121,959 A * | 6/1992 | King | ......................... | B60R 9/00 224/310 |
| 5,799,849 A * | 9/1998 | Beer | ....................... | B60R 11/00 224/282 |
| 6,626,479 B1 | 9/2003 | Skoug | | |
| 6,832,709 B2 * | 12/2004 | Henry | ...................... | B60D 1/06 224/403 |
| 8,393,665 B2 | 3/2013 | Villano et al. | | |
| 8,882,419 B2 * | 11/2014 | Aguirre | ................. | B60P 7/0807 410/106 |
| 9,156,412 B1 | 10/2015 | Calvert | | |
| 9,481,315 B1 | 11/2016 | Gordon | | |
| 9,481,403 B1 | 11/2016 | Johnson | | |
| D819,544 S * | 6/2018 | Dorminey | ..................... | D12/414 |
| 2011/0284602 A1 | 11/2011 | Lamouroux | | |
| 2016/0325669 A1* | 11/2016 | Byham | .................. | B60P 7/0807 |

* cited by examiner

Primary Examiner — D Glenn Dayoan
Assistant Examiner — Sunsurraye Westbrook
(74) Attorney, Agent, or Firm — Carlson, Gaskey & Olds, P.C.

(57) ABSTRACT

A cargo securement system is disclosed and includes a track securable to a fixed mounting location within a cargo area. A slidable mount is movable along the track and securable at different positions along a longitudinal length to provide different securement positions adaptable to the cargo.

13 Claims, 5 Drawing Sheets

BOX LINK VERTICAL TRACK

TECHNICAL FIELD

This disclosure relates to an adaptor for a fixed mount that enables movement of securement structures utilized to secure cargo items.

BACKGROUND

Vehicles such as a pickup truck include a cargo area with features for securing cargo. Some features include loops to which chords or rope can be attached to hold cargo in place within the cargo area. One securement feature includes a fixed mount structure that is adapted to receive different structures such as cleats for attachment of straps and rope. Different accessory structures can be attached to the fixed mount to provide different means of securing cargo. Each of the accessory structures is fixed to the location of the fixed mount structure.

Vehicle manufactures continually seek improvements in vehicle performance and storage capacity that create value for a consumer and promote brand loyalty.

SUMMARY

A system according to an exemplary aspect of the present disclosure includes, among other things, a cargo securement system for a motor vehicle comprising, a track having a longitudinal length, a bracket attached to the track and mountable to a fixes structure within a cargo area of a motor vehicle and a slidable mount supported on the track and securable at different position along the longitudinal length of the track.

In a further non-limiting embodiment of the foregoing cargo securement system, the slidable mount has a mount opening that defines a mounting location for a securement device.

In a further non-limiting embodiment of the foregoing cargo securement system, the mount opening includes an upper open space having a first width and a lower open space having a second width greater than the first width.

In a further non-limiting embodiment of any of the foregoing cargo securement systems, the securement device includes a locking portion that is securable to both the fixed structure and the mount opening in the slidable mount.

In a further non-limiting embodiment of any of the foregoing cargo securement systems, the bracket includes a first bracket part that is attached to the track and a second bracket part that secures the first bracket part to the fixed structure.

In a further non-limiting embodiment of any of the foregoing cargo securement systems, the fixed structure has a fixed mounting opening and the first bracket part and the second bracket part are secured within the mounting opening when mounted to the fixed structure.

In a further non-limiting embodiment of any of the foregoing cargo securement systems, the track includes a plurality of locking openings spaced apart along the longitudinal length and the slidable mount includes a locking pin received within one of the plurality of locking openings for securing the slidable mount to a position on the track.

In a further non-limiting embodiment of any of the foregoing cargo securement systems, the locking pin is pivotally mounted to the slidable mount for movement between a locked position where a portion of the locking pin is received within one of the plurality of locking openings and a released position that allows movement of the slidable mount.

In a further non-limiting embodiment of any of the foregoing cargo securement systems, the track is disposed vertically when mounted within the cargo area.

A cargo system for a pickup truck cargo bed according to another exemplary aspect of the present disclosure includes, among other things, a fixed mount supported in a fixed structure of the truck cargo bed, a bracket mountable to the fixed mount, a track having a longitudinal length attached to the bracket and a slidable mount supported on the track and securable at different positions along the longitudinal length of the track.

In a further non-limiting embodiment of any of the foregoing cargo system, the slidable mount has a slidable mount opening that defines a mounting location for a securement device.

In a further non-limiting embodiment of any of the foregoing cargo systems, the fixed mount includes a fixed mount opening and the fixed mount opening and the slidable mount opening have a common size and shape such that accessory structures that fit into the fixed mount opening also fit into the slidable mount opening.

In a further non-limiting embodiment of any of the foregoing cargo systems, including an accessory structure including a mount portion receivable within the fixed mount opening and the slidable mount opening and a securement portion utilized for securing a load within the cargo bed.

In a further non-limiting embodiment of any of the foregoing cargo systems, the accessory structure is part of a container securable within the truck cargo bed.

In a further non-limiting embodiment of any of the foregoing cargo systems, the bracket comprises a first bracket portion receivable within the fixed mount opening and a second bracket portion also receivable within the fixed mount opening that prevents removal of the first bracket portion from the fixed mount opening.

In a further non-limiting embodiment of any of the foregoing cargo systems, the track includes a plurality of locking openings spaced apart along the longitudinal length and the slidable mount includes a locking pin received within one of the plurality of locking openings for securing the slidable mount to a position on the track.

In a further non-limiting embodiment of any of the foregoing cargo systems, the locking pin is pivotally mounted to the slidable mount for movement between a locked position where a portion of the locking pin is received within one of the plurality of locking openings and a released position that allows movement of the slidable mount.

In a further non-limiting embodiment of any of the foregoing cargo systems, the track is disposed vertically when mounted within the cargo area.

The various features and advantages of this disclosure will become apparent to those skilled in the art from the following detailed description. The drawings that accompany the detailed description can be briefly described as follows.

DETAILED DESCRIPTION

This disclosure details an exemplary apparatus for using a track for expanding securement options of a box link mount within a vehicle cargo area. These and other features are discussed in greater detail in the following paragraphs of this detailed description.

Figure 1:
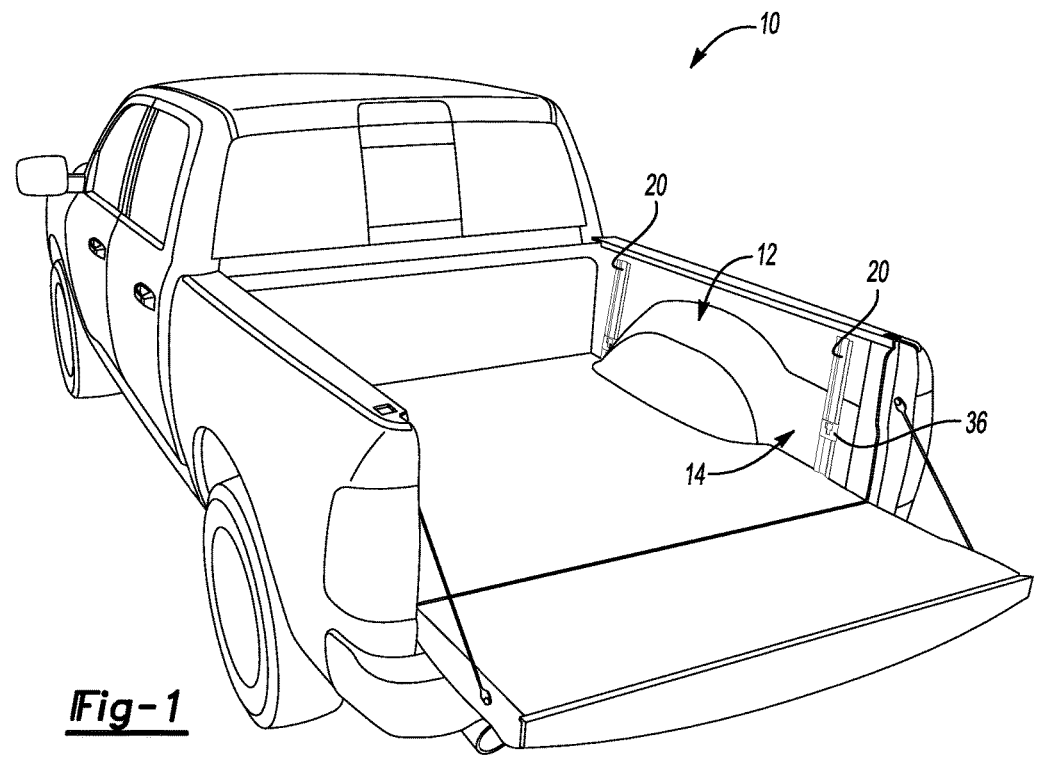
FIG. 1 is a schematic view of a cargo bed for a pickup truck.
Figure 2:
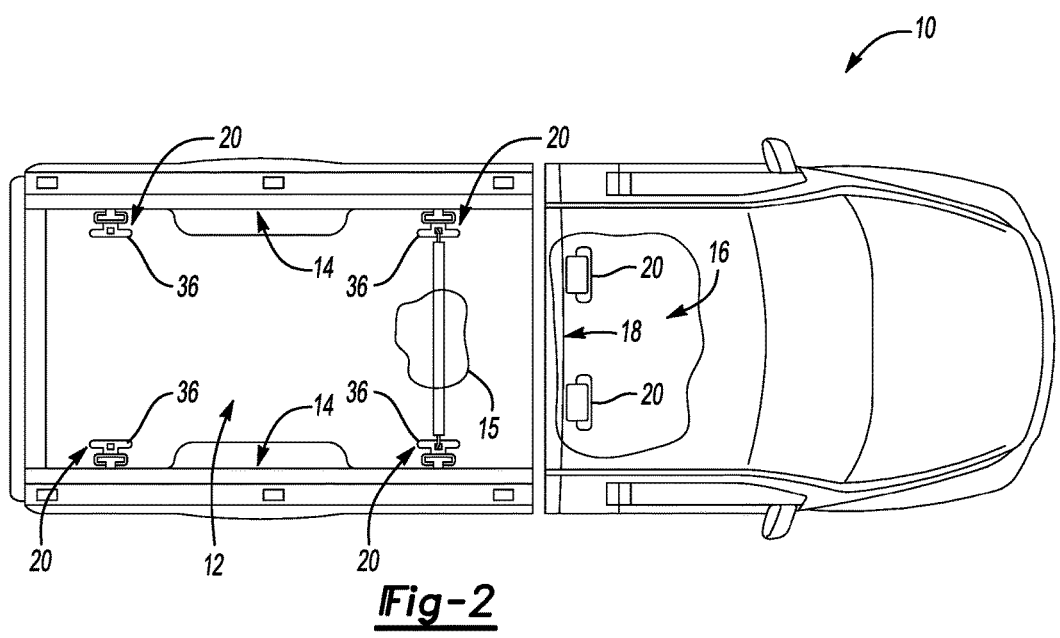
FIG. 2 is a top view of a cargo bed of a pickup truck.

Referring to FIGS. 1 and 2, a vehicle 10 includes a cargo area 12 having sidewalls 14. Attached to the sidewalls 14 are track assemblies 20. The track assemblies 20 are attached to a fixed mount secured to the sidewalls 14 that enable the use of securement accessory items for securing and lashing down a load 15 carried within the cargo area 12.

The track assemblies 20 each include a slidable mount 36 that enables movement and adjustment of the attachment point for lashing and securing the load 15 within the cargo area 12. In this example, the track assemblies 20 are mounted to provide vertical movement and adjustment of a position of the slidable mount 36.

The vehicle 10 also includes an interior compartment 16 with a back wall 18. The back wall 18 can also include track assemblies 20. Moreover, although the track assemblies 20 are shown on sidewalls of the cargo area 12 and a back wall 18 of the interior compartment 16, the track assemblies 20 can be utilized anywhere that a fixed mount structure is located.

Figure 3:
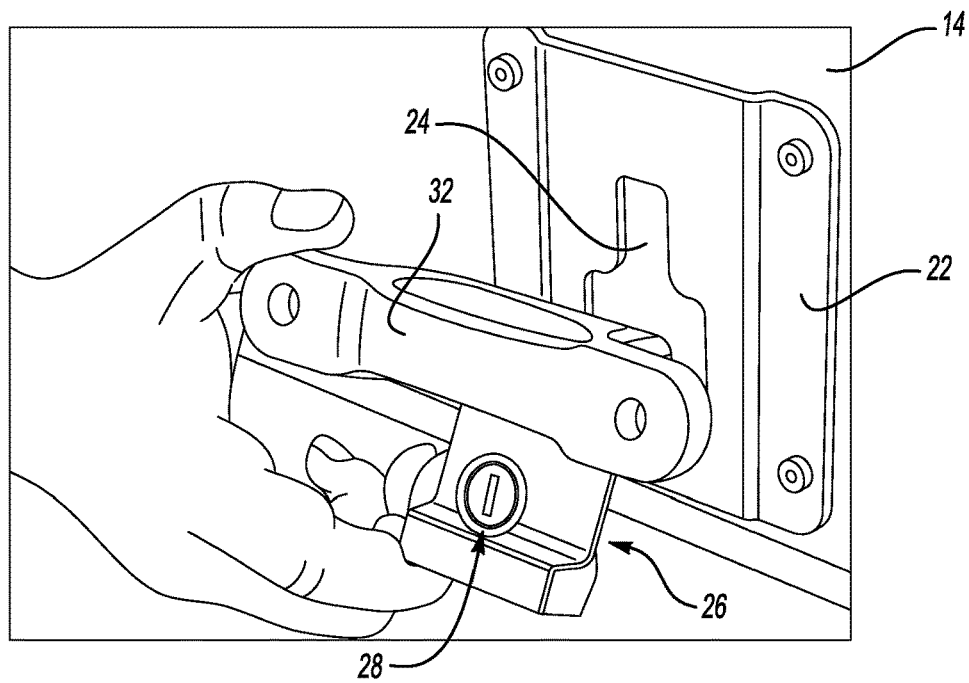
FIG. 3 is a schematic view of a box link fixed mount and accessory item.
Figure 4:
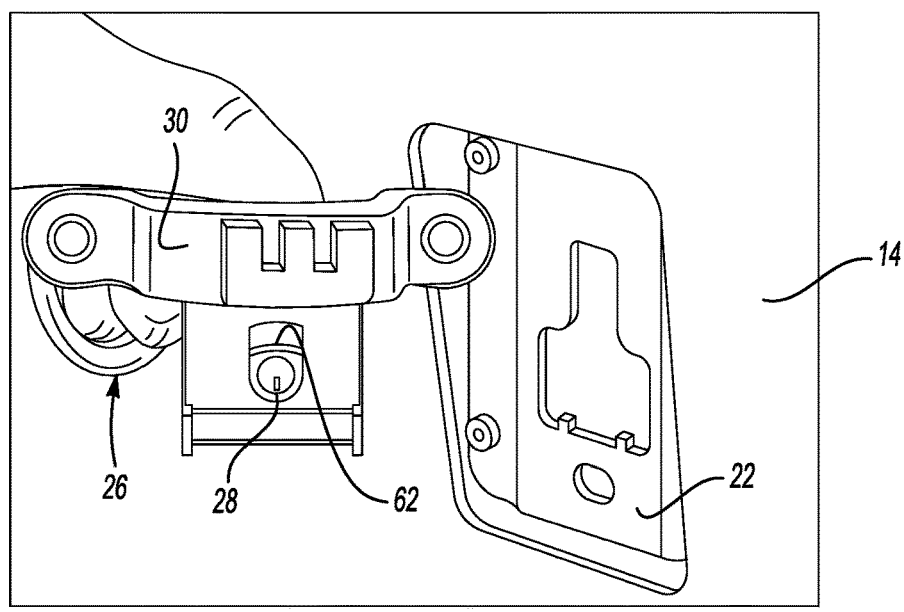
FIG. 4 is another view of a box link fixed mount and accessory item.
Figure 5:
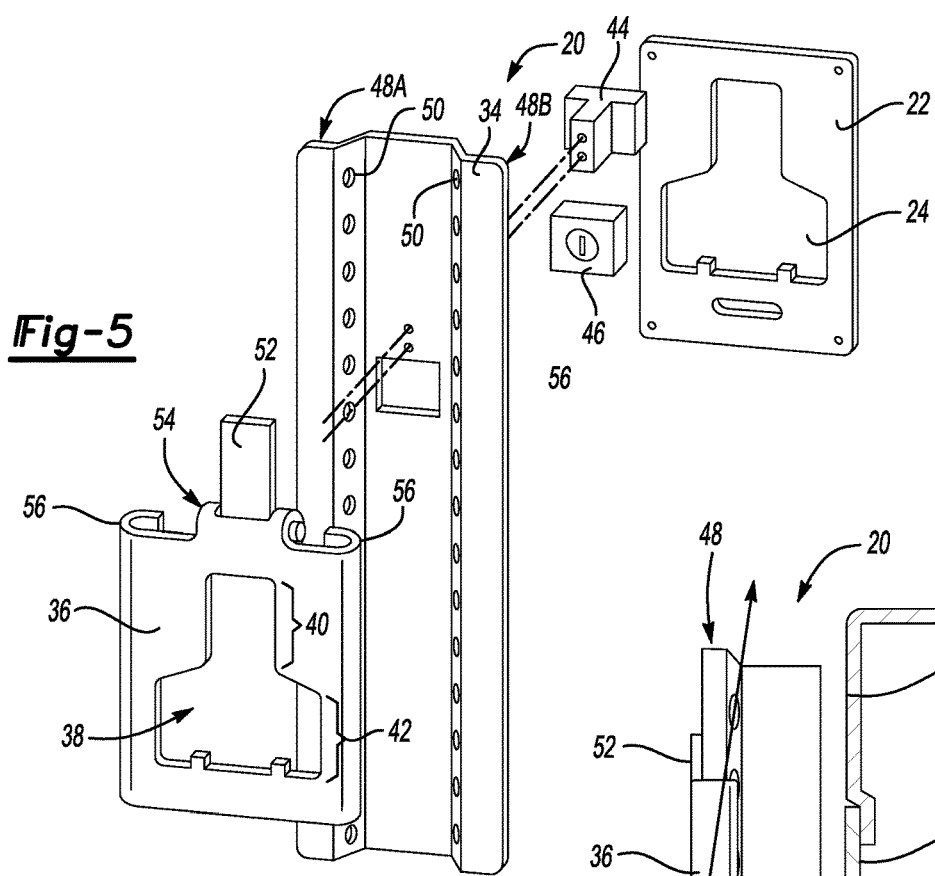
FIG. 5 is an exploded view of an example track assembly according to an example embodiment.
Figure 6:
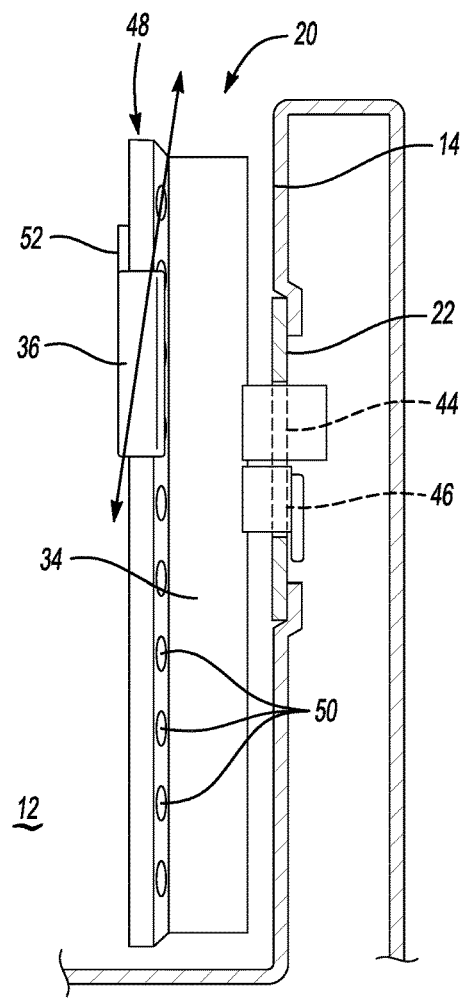
FIG. 6 is a side sectional view of the example track assembly.
Figure 8:
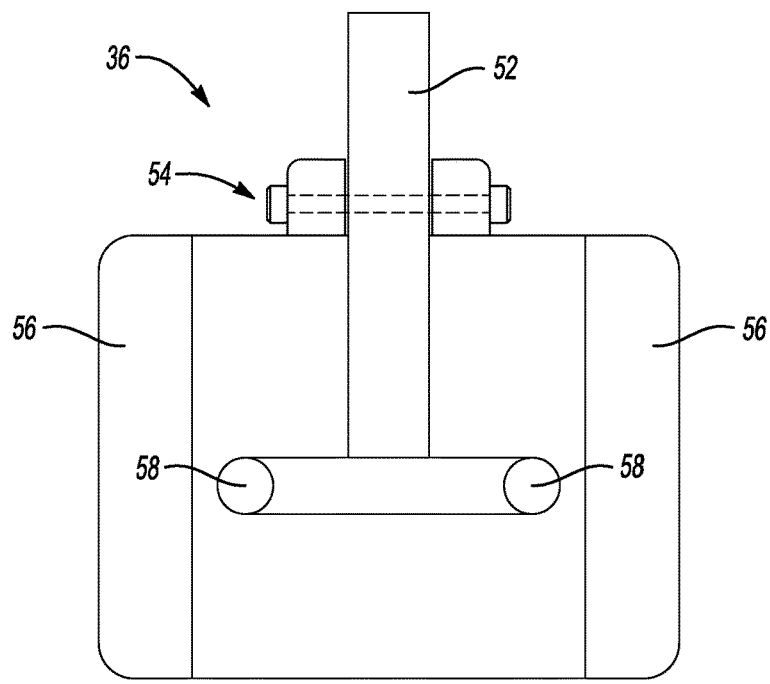
FIG. 8 is a back view of the example slidable mount.
Figure 9:
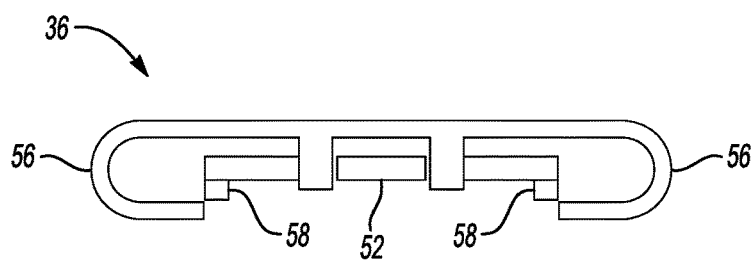
FIG. 9 is a top view of the example slidable mount.
Figure 10:
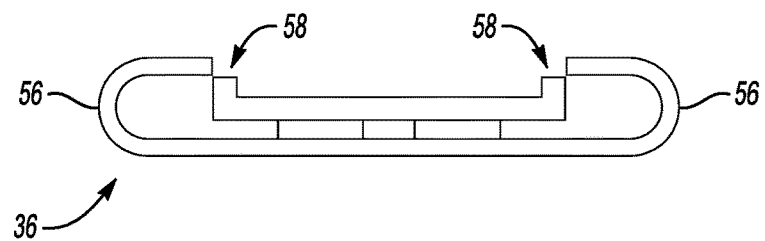
FIG. 10 is a bottom view of the example slidable mount.

Referring to FIGS. 3 and 4 with continued reference to FIG. 2, a fixed mount structure 22 is secured to sidewalls 14 of the cargo area 12. The fixed mount 22 includes an open area 24 that includes a shape that corresponds with features of a securement device such as a cleat 32. Each of the securement feature accessories 32 include a locking portion 28 and a mount portion 30. The mount portion 30 slides into a top portion of the fixed mount opening 24 and the lock portion 28 goes into lower portion of the mount opening 24. The lock portion 28 includes a toggle 62 that is moveable to a lock position to prevent removal of the securement accessory item 32 from the mount opening 24. As is shown in FIGS. 3 and 4, the fixed mount 22 provides a location for mounting of the securement accessory 32. Different configurations of securement accessories have a common mount portion 30 and lock portion 28 such that all are compatible and securable within the mount opening 24. The securement accessory 32 is fixed and not moveable once attached to the Referring to FIGS. 5 and 6 with continued reference to FIGS. 3 and 4, the example track assembly 20 is mountable to the fixed mount 22 and includes a track 34 that supports a slidable mount 36 such that a position of the securement accessory items 32 can be varied to accommodate different loads and cargo.

The track 34 is held in place within the fixed mount 22 by a first bracket portion 44 and a second bracket portion 46. The first bracket portion 44 fits within an upper portion of the fixed mount opening 24. The second bracket portion 46 includes a locking feature like the lock portion 28 of the securement accessory item 32. The locking feature of the second bracket portion 46 secures the first bracket portion 44 within the opening 24. The track 34 is attached to the first bracket portion 44 by threaded fasteners or other fastening items as are known in the art. The second bracket portion 46 includes a lock that is secured within the opening to prevent removal of the track assembly 20 by unauthorized persons.

The example slidable mount 36 includes a slidable mount opening 38 that includes an upper mount opening 40 and a lower opening portion 42. The slidable mount opening 38 is the same size and shape as the fixed mount opening 24. Accordingly, any securement accessories such as those illustrated in FIG. 3 that are designed for securement to the fixed mount 22 can be utilized and fixed to the slidable mount 36.

Figure 7:
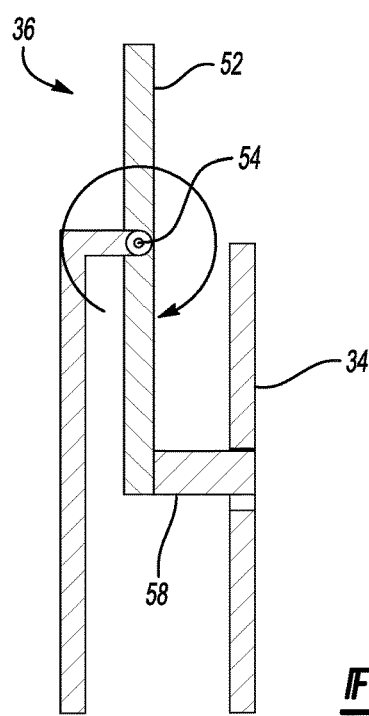
FIG. 7 is a side view of an example slidable mount.

The slidable mount 36 includes curve portions 56 that wrap around wing portions 48 of the track 54. The slidable mount 36 includes a lever 52 that rotates about a pivot 54 that selectively moves locking pins 58 (shown in FIG. 7) into and out of locking openings 50 disposed along the longitudinal length of the track 34.

Referring to FIGS. 7, 8, 9, and 10, the slidable mount portion 36 includes the lever 52 that rotates about the pivot 54 to move the locking pins 58 into and out of openings 50 defined within the track 34. The slidable mount 36 includes C-shaped curve portions 56 that wrap around the wing portions 48 in the track 34. The lever 52 operates to move locking pins 58 into and out of openings 50 along the track 34 to secure the slidable mount in the desired position along the track 34. Accordingly, the slidable mount 36 can be positioned in various locations along the track 34.

In this disclosed example embodiment, the track 34 is disposed in a vertical orientation relative to the static mount 22 and walls 14 of the cargo bed 12. However, it should be understood that it is within the contemplation of this invention that the track 34 may be orientated in a horizontal manner to allow horizontal positioning away from the static mount 22.

Figure 11:
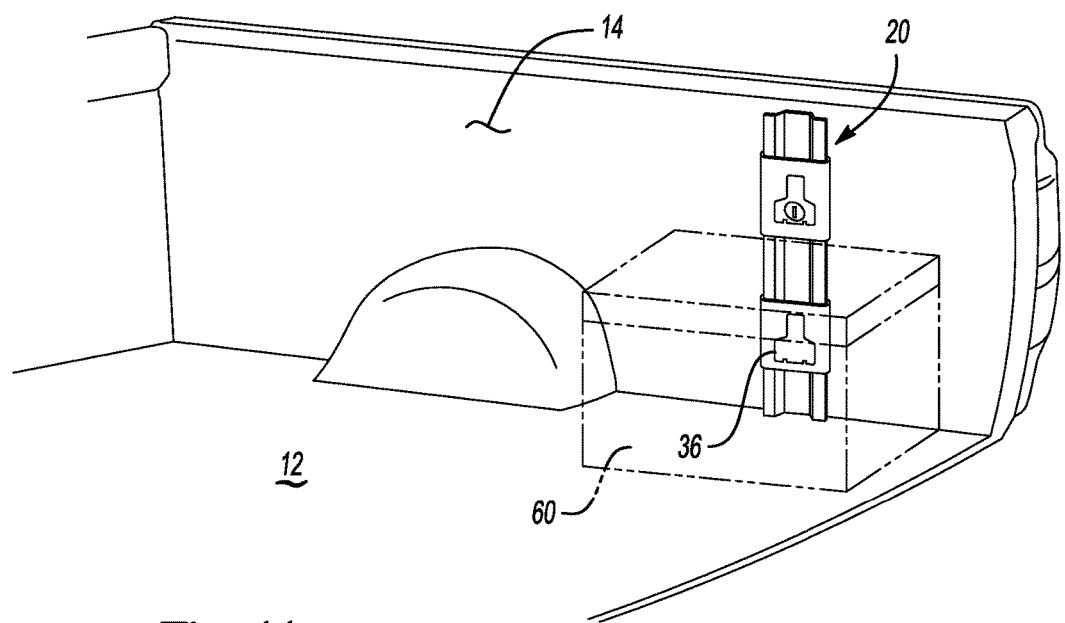
FIG. 11 is a schematic view of a container attached to the example track assembly.

Referring to FIG. 11, the track assembly 20 may also be utilized with a container 60 that includes features that are compatible with a mount within the slidable mount opening 38. Additionally, the slidable mount 36 is movable along the track 34 so that after a lashing strap or other securement device is attached to the slidable mount, the slidable mount 36 can be moved downward to further tighten and secure a load within the cargo area.

Accordingly, the example track assembly 20 is mountable to the static mount 22 provided within a truck cargo bed 12 to provide additional positioning of securement accessories and duplicates the mount opening provided by the static mount such that all securement accessory items that are intended for use with the fixed mount can also be used with the track assembly 20.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A cargo securement system for a motor vehicle comprising:
a track having a longitudinal length;
a bracket attached to the track and mountable to a fixed structure within a cargo area of a motor vehicle, the bracket including a first portion and a second portion that are both receivable within a common opening within the fixed structure, wherein the second bracket portion prevents removal of the first bracket portion from the common opening;
a slidable mount supported on the track and securable at different positions along the longitudinal length of the track, wherein the slidable mount includes a mount opening that defines a mounting location for a securement device.

2. The system as recited in claim 1, wherein the mount opening includes an upper open space having a first width and a lower open space having a second width greater than the first width.

3. The system as recited in claim 1, wherein the securement device includes a locking portion that is securable to both the fixed structure and the mount opening in the slidable mount.

4. The system as recited in claim 1, wherein the track includes a plurality of locking openings spaced apart along the longitudinal length and the slidable mount includes a locking pin received within one of the plurality of locking openings for securing the slidable mount to a position on the track.

5. The system as recited in claim 4, wherein the locking pin is pivotally mounted to the slidable mount for movement between a locked position where a portion of the locking pin is received within one of the plurality of locking openings and a released position that allows movement of the slidable mount.

6. The system as recited in claim 1, wherein the track is disposed vertically when mounted within the cargo area.

7. A cargo system for a pickup truck cargo bed, the cargo system comprising:
a fixed mount supported in a fixed structure of the truck cargo bed, the fixed mount including a fixed mount opening;
a first bracket portion receivable within the fixed mount opening and a second bracket portion also receivable within the fixed mount opening that prevents removal of the first bracket portion from the fixed mount opening;
a track having a longitudinal length attached to the first bracket portion; and
a slidable mount supported on the track and securable at different positions along the longitudinal length of the track, wherein the slidable mount has a slidable mount opening that defines a mounting location for a securement device.

8. The system as recited in claim 7, wherein the fixed mount includes a fixed mount opening and the fixed mount opening and the slidable mount opening have a common size and shape such that accessory structures that fit into the fixed mount opening also fit into the slidable mount opening.

9. The system as recited in claim 8, including an accessory structure including a mount portion receivable within the fixed mount opening and the slidable mount opening and a securement portion utilized for securing a load within the cargo bed.

10. The system as recited in claim 9, wherein the accessory structure is part of a container securable within the truck cargo bed.

11. The system as recited in claim 7, wherein the track includes a plurality of locking openings spaced apart along the longitudinal length and the slidable mount includes a locking pin received within one of the plurality of locking openings for securing the slidable mount to a position on the track.

12. The system as recited in claim 11, wherein the locking pin is pivotally mounted to the slidable mount for movement between a locked position where a portion of the locking pin is received within one of the plurality of locking openings and a released position that allows movement of the slidable mount.

13. The system as recited in claim 7, wherein the track is disposed vertically when mounted within the cargo area.

* * * * *